(12) United States Patent
Paschkowski (10) Patent No.: US 8,389,647 B2
(45) Date of Patent: Mar. 5, 2013

(54) LAMINATING ADHESIVE FOR DEMOULDING AT ELEVATED TEMPERATURE

(75) Inventor: Kai Paschkowski, Jork (DE)

(73) Assignee: Sika Technology AG, Baar (CH)

( * ) Notice: Subject to any disclaimer, the term of this patent is extended or adjusted under 35 U.S.C. 154(b) by 360 days.

(21) Appl. No.: 12/379,675

(22) Filed: Feb. 26, 2009

(65) Prior Publication Data

US 2009/0214875 A1    Aug. 27, 2009

(30) Foreign Application Priority Data

Feb. 27, 2008   (EP) ..................................... 08151977

(51) Int. Cl.
*C08L 75/04* (2006.01)
*C08L 75/06* (2006.01)

(52) U.S. Cl. .............................. 525/440.01; 525/440.12

(58) Field of Classification Search ............... 428/423.1; 525/440.01, 440.12
See application file for complete search history.

(56) References Cited

U.S. PATENT DOCUMENTS

| | | | | |
|---|---|---|---|---|
| 4,404,320 A | * | 9/1983 | Goto et al. ..................... | 525/58 |
| 2005/0033004 A1 | | 2/2005 | Hoffmann et al. | |
| 2006/0025555 A1 | * | 2/2006 | Ichihashi et al. ................ | 528/44 |

FOREIGN PATENT DOCUMENTS

DE    199 58 526 A1    6/2000

* cited by examiner

*Primary Examiner* — Thao T. Tran
(74) *Attorney, Agent, or Firm* — Oliff & Berridge, PLC (57) ABSTRACT

The present invention relates to a laminating adhesive composition, which contains a reaction product which contains isocyanate groups and which is obtained from the reaction of at least two specific polyester polyols, solid at room temperature, and a polyisocyanate. Particularly in the case of three-dimensionally deformed support material surfaces, the laminating adhesive compositions permit removal from the laminating mold at an elevated temperature.

8 Claims, 4 Drawing Sheets

LAMINATING ADHESIVE FOR DEMOULDING AT ELEVATED TEMPERATURE

FIELD OF THE INVENTION

The invention relates to the field of moisture-curing polyurethane hot-melt adhesives and their use as laminating adhesives.

DESCRIPTION OF THE PRIOR ART

Moisture-curing polyurethane hot melt adhesives have been employed for some considerable time as laminating adhesives. Laminating adhesives of this kind, for example from DE 199 58 526 A1 or US2005/0033004 A1, typically comprise a polyurethane prepolymer which is terminated with isocyanate groups and which at the application temperature is in melted form, solidifies following application, on cooling, and undergoes crosslinking with atmospheric moisture. Nevertheless it has emerged that these known laminating adhesives, although highly suitable when the laminated articles are removed from the laminating mould at room temperature nevertheless display frequent instances of film detachment on removal at an elevated temperature, particularly when the support material in question is a three-dimensionally shaped body.

SUMMARY OF THE INVENTION

It is an object of the present invention, therefore to provide laminating adhesive compositions which overcome the drawbacks of the prior art. Surprisingly it has now been found that laminating adhesive compositions described herein achieve this object.

These laminating adhesive compositions are notable in particular for the fact that they are prepared using at least two specific polyester polyols which are solid at room temperature.

The laminating adhesive compositions exhibit excellent results in the laminating of shaped bodies using polymeric films. A particular advantage in this context, however, is the fact that even at relatively high temperatures they can be removed from the laminating mould without first having to wait for the adhesive to have cooled to room temperature. Even at temperatures of typically 40° C. or more, in particular 50° C. or more, a reliable assembly of the laminated support material can be ensured. This permits, in particular, more rapid demoulding and hence a shorter cycle time in an industrial laminating operation, and is therefore of great interest not only for reasons of higher quality but also, in particular of economics.

Further aspects of the invention are represented by the methods for laminating a support material with a polymeric film and the laminated support materials obtained by such methods, as described herein.

Preferred embodiments of the invention are subject matter of the dependant claims.

DESCRIPTION OF THE PREFERRED EMBODIMENTS

The present invention provides in a first aspect a laminating adhesive composition comprising a reaction product which contains isocyanate groups and is obtained from the reaction of a) at least one crystalline polyester polyol P1 which is solid at room temperature and has a molecular weight of between 1500 and 9000 g/mol and a softening point of more than 100° C.; and b) at least one polyester polyol P2 which is solid at room temperature and has a molecular weight of 10 000 to 50 000 g/mol and a softening point of more than 130° C.;

c) if desired at least one polyol P3;

with d) at least one polyisocyanate P, the polyisocyanate P being used in a stoichiometric excess in relation to the polyols P1 and P2 and P3.

The term "polymer" embraces in the present document on the one hand a collective of chemically uniform macromolecules which nevertheless differ in respect of the degree of polymerization, molar mass and chain length and have been prepared by a polymerization reaction (addition polymerization, polyaddition, polycondensation). On the other hand, the term also embraces derivatives of such a collective of macromolecules from polymerization reactions, in other words compounds which have been obtained by reactions, such as addition reactions or substitution reactions, of functional groups on existing macromolecules and which may be chemically uniform or chemically non-uniform. The term furthermore, also embraces what are called prepolymers, in other words reactive oligomeric preadducts whose functional groups have participated in the synthesis of macromolecules.

The term "polyurethane polymer" embraces all polymers which are prepared by the diisocyanate polyaddition process. This also includes those polymers which are virtually or entirely free from urethane groups. Examples of polyurethane polymers are polyether-polyurethanes, polyester-polyurethanes, polyether-polyureas, polyureas, polyester-polyureas, polyisocyanurates and polycarbodiimides.

"Room temperature" refers to a temperature of 25° C.

Substance names beginning with "poly", such as polyisocyanate, polyol or polyamine, in the present document identify substances which formally contain two or more per molecule of the functional groups that occur in their name.

By "molecular weight" is meant in the present document always the molecular weight average $M_n$.

"Crystalline" polyols in this document also comprehend polyols which are not fully crystalline, i.e. partially crystalline.

All softening points of polyols are determined in this document by the ring & ball method in accordance with DIN ISO 4625.

The crystalline polyester polyol P1 which is solid at room temperature, has a molecular weight of between 1500 and 9000 g/mol and a softening point of more than 100° C.

The polyester polyol P2 is solid at room temperature and has a molecular weight of 10 000 to 50 000 g/mol and a softening point of more than 130° C.

Suitable polyester polyols for P1 and P2 are polyesters which carry at least two hydroxyl groups, and are prepared by known processes, especially the polycondensation of hydroxycarboxylic acids or the polycondensation of aliphatic and/or aromatic polycarboxylic acids with dihydric or polyhydric alcohols.

Particularly suitable polyester polyols are those prepared from dihydric to trihydric, especially dihydric, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), neopentyl glycol hydroxypivalate, glycerol, 1,1,1-trimethylolpropane or mixtures of the aforementioned alcohols, with organic dicarboxylic or tricarboxylic acids, especially dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride, or mixtures of the aforementioned acids, and also polyester polyols formed from lactones, such as, for example, from ε-caprolactone and starters such as the aforementioned dihydric or trihydric alcohols, also referred to as polycaprolactone polyols.

Particularly suitable polyester polyols are polyester diols. Especially suitable polyester diols are those prepared from adipic acid, azelaic acid, sebacic acid, dodecanedicarboxylic acid, dimer fatty acid, phthalic acid, isophthalic acid and terephthalic acid as dicarboxylic acid and from ethylene glycol, diethylene glycol, neopentyl glycol, 1,4-butanediol, 1,6-hexanediol, dimer fatty acid diol and 1,4-cyclohexanedimethanol as dihydric alcohol. Also especially suitable are polyester diols, which are prepared from ε-caprolactone and one of the aforementioned dihydric alcohols as starters.

The polyester polyols P1 and P2 are solid at room temperature.

The polyester polyol P1 is crystalline. The polyester polyol P1 has a softening point of more than 100° C., in particular between 105 and 150° C., preferably between 105 and 130° C. The polyester polyol P1 has advantageously an OH number of 10-50 mg KOH/g, in particular of 25-40 mg KOH/g.

The polyester polyol P2 may be crystalline or amorphous. Preferably it is crystalline. The polyester polyol P2 has a softening point of more than 130° C., in particular between 135 and 190° C., preferably between 140 and 165° C. The polyester polyol P2 has advantageously an OH number of less than 5 mg KOH/g, in particular of 1-5 mg KOH/g.

Particularly suitable as polyol P3 are polyether polyols and polycarbonate polyols and also polyester polyols.

With particular preference the polyol P3 is liquid at room temperature. With more particular preference the polyol P3 is a polyester polyol, especially polyester diol, which is liquid at room temperature.

Particularly suitable polyether polyols, also called polyoxyalkylene polyols, are those which are polymerization products of ethylene oxide, 1,2-propylene oxide, 1,2- or 2,3-butylene oxide, tetrahydrofuran or mixtures thereof, optionally polymerized by means of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclo-hexanedimethanol, bisphenol A, hydrogenated bisphenol A, 1,1,1-trimethylolethane, 1,1,1-trimethylolpropane, glycerol, aniline and also mixtures of the aforementioned compounds. It is possible to use not only polyoxyalkylene polyols which have a low degree of unsaturation (measured by ASTM D-2849-69 and reported in milliequivalents of unsaturation per gram of polyol (mEq/g)), as prepared for example by means of what are known as double metal cyanide complex catalysts (DMC-catalysts), but also polyoxyalkylene polyols having a higher degree of unsaturation, prepared for example by means of anionic catalysts such as NaOH, KOH or alkali metal alcoxides.

Particularly suitable polyether polyols are polyoxyalkylene diols and triols, in particular polyoxyalkylene diols. Particularly suitable polyoxyalkylene diols and triols are polyoxyethylene diols and triols and also polyoxypropylene diols and triols.

Particularly suitable are polyoxypropylene diols and triols having a degree of unsaturation of less than 0.02 mEq/g and a molecular weight in the range from 1000 to 30 000 g/mol, and also polyoxypropylene diols and triols having a molecular weight of 400 to 8000 g/mol. By "molecular weight" or "molar weight" is always meant in the present document the molecular weight average $M_n$. Particular suitability is possessed by polyoxypropylene diols having a degree of unsaturation of less than 0.02 mEq/g and a molecular weight in the range from 1000 to 12 000, in particular between 1000 and 8000 g/mol. Such polyether polyols are sold, for example, under the trade name Acclaim® by Bayer.

Likewise particularly suitable are what are called "EO-end capped" (ethylene oxide-end capped) polyoxypropylene diols and triols. The latter are special polyoxypropylene-polyoxyethylene polyols which are obtained, for example, by alkoxylating pure polyoxypropylene polyols, after the end of the polypropoxylation, with ethylene oxide and which as a result contain primary hydroxyl groups.

Particularly suitable polycarbonate polyols are those of the kind obtainable by polycondensation, for example, of the abovementioned dihydric or trihydric alcohols—those used to synthesize the polyester polyols—with dialkyl carbonates such as dimethyl carbonate, diaryl carbonates, such as diphenyl carbonate, or phosgene.

Particular suitability is possessed by polycarbonate diols, especially amorphous polycarbonate diols.

Likewise suitable as polyols P3 are the following:

styrene-acrylonitrile- or acrylonitrile-methyl(meth)acrylate-grafted polyether polyols.

block copolymers which carry at least two hydroxyl groups, and which have at least two different blocks with polyether, polyester and/or polycarbonate structure of the type described above.

polyacrylate and polymethacrylate polyols.

polyhydroxy-functional fats and oils, examples being natural fats and oils, especially castor oil; or polyols obtained by chemical modification of natural fats and oils, known as oleochemical polyols, examples being the epoxy polyesters or epoxy polyethers obtained by epoxidation of unsaturated oils and subsequent ring opening with carboxylic acids or alcohols, respectively, or polyols obtained by hydroformylation and hydrogenation of unsaturated oils; or polyols obtained from natural fats and oils by degradation operations such as alcoholysis or ozonolysis and subsequent chemical linking, by means for example of transesterification or dimerization, of the resulting degradation products or derivatives thereof. Suitable degradation products of natural fats and oils are, in particular fatty acids and fatty alcohols, and fatty acid esters, especially the methyl esters (FAME), which can be derivatized, for example, by hydroformylation and hydrogenation to give hydroxy fatty acid esters.

Polyhydrocarbon polyols, also called oligohydrocarbonols, such as, for example, polyhydroxy-functional polyolefins, polyisobutylenes, polyisoprenes; polyhydroxy-functional ethylene-propylene, ethylene-butylene or ethylene-propylene-diene copolymers, of the kind produced, for example, by Kraton Polymers; polyhydroxy-functional polymers of dienes, especially from 1,3-butadiene, which in particular may also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, examples being polyhydroxy-functional acrylonitrile/butadiene copolymers, which are preparable, for example, from carboxyl-terminated acrylonitrile/butadiene copolymers (available commercially under the name Hypro™ (formerly Hycar®) CTBN and CTBNX from Nanoresins AG, Germany, or Emerald Performance Materials LLC) and epoxides or amino alcohols; and also hydrogenated polyhydroxy-functional polymers or copolymers of dienes.

Particular suitability as polyols P3 is possessed by polyester polyols which are liquid at room temperature. These polyols can be prepared from the reactants already described in detail above for P1 and P2.

A suitable polyisocyanate P for the preparation of the reaction product is in one embodiment a polyisocyanate PI in the form of a monomeric di- or triisocyanate or of an oligomer of a monomeric diisocyanate or of a derivative of a monomeric diisocyanate.

Examples of suitable monomeric di- or triisocyanates are the following: 1,4-tetramethylene diisocyanate, 2-methyl-pentamethylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate, 1-methyl-2,4- and -2,6-diisocyanatocyclohexane and any desired mixtures of these isomers (HTDI or $H_6$TDI), 1-isocyanato-3,3,5-trimethyl-5-isocyanatomethylcyclohexane (i.e. isophorone diisocyanate or IPDI), perhydro-2,4'- and 4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di(1-heptenyl)cyclohexene (dimeryl diisocyanate), $\alpha,\alpha,\alpha',\alpha',\alpha''$, $\alpha''$-hexamethyl-1,3,5-mesitylene triisocyanate, 2,4- and 2,6-toluoylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatobiphenyl (TODI), dianisidine diisocyanate (DADI), 1,3,5-tris(isocyanatomethyl)benzene, tris(4-isocyanatophenyl)methane and tris(4-isocyanatophenyl) thiophosphate.

Particularly suitable polyisocyanates PI are oligomers or derivates of monomeric diisocyanates, especially of HDI, IPDI, TDI and MDI. Commercially available products are in particular HDI biurets, available for example as Desmodur® N 100 and N 3200 (Bayer), Tolonate® HDB and HDB-LV (Rhodia) and Duranate® 24A-100 (Asahi Kasei); HDI isocyanurates, available for example as Desmodur® N 3300, N 3600 and N 3790 BA (all from Bayer), Tolonate® HDT, HDT-LV and HDT-LV2 (Rhodia), Duranate® TPA-100 and THA-100 (Asahi Kasei) and Coronate® HX (Nippon Polyurethane); HDI uretdiones, available for example as Desmodur® N 3400 (Bayer); HDI iminooxadiazinediones, available for example as Desmodur® XP 2410 (Bayer); HDI allophanates, available for example as Desmodur® VP LS 2102 (Bayer); IPDI isocyanurates, for example in solution as Desmodur® Z 4470 (Bayer) or in solid form as Vestanat® T1890/100 (Degussa); TDI oligomers, available for example as Desmodur® IL (Bayer); and also mixed isocyanurates based on TDI/HDI, available for example as Desmodur® HL (Bayer). Also particularly suitable are room temperature-liquid forms of MDI (known as "modified MDI"), which represent mixtures of MDI with MDI derivatives, such as MDI carbodiimides and/or MDI uretonimines or MDI urethanes, for example, as known, for example under trade names such as Desmodur® CD, Desmodur® PF, Desmodur® PC (all from Bayer), and also mixtures of MDI and MDI homologs (polymeric MDI or PMDI), available under trade names such as Desmodur® VL, Desmodur® VL50, Desmodur® VL R10, Desmodur® VL R20 and Desmodur® VKS 20F (all from Bayer), Isonate® M 309, Voranate® M 229 and Voranate® M 580 (all from Dow) or Lupranat® M 10R (from BASF).

In practice, the aforementioned oligomeric polyisocyanates PI typically constitute mixtures of substances having different degrees of oligomerization and/or chemical structures. Preferably they have an average NCO functionality of 2.1 to 4.0 and contain, in particular, isocyanurate, iminooxadiazinedione, uretdione, urethane, biuret, allophanate, carbodiimide, uretonimine or oxadiazinetrione groups. Preferably these oligomers have a low monomeric diisocyanate content.

Preferred polyisocyanates PI are room temperature liquid forms of MDI, and also the oligomers of HDI, IPDI and TDI, especially the isocyanurates.

A suitable polyisocyanate P in another embodiment is a polyurethane polymer PUP containing isocyanate groups.

A suitable polyurethane polymer PUP containing isocyanate groups is obtainable through the reaction of at least one polyol with at least one polyisocyanate.

As polyols for preparing a polyurethane polymer PUP it is possible for example to use the polyols already stated as polyesters P1 or P2 or polyols P3. Further to these stated polyols it is possible to use small amounts of low molecular weight dihydric or polyhydric alcohols such as for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols such as dimer fatty acid diols, for example, 1,1,1-trimethylolethane, 1,1,1-trimethylolpropane, glycerol, pentaerythritol, low molecular weight alkoxylation products of the aforementioned dihydric and polyhydric alcohols, and also mixtures of the aforementioned alcohols, when preparing a polyurethane polymer PUP.

Polyisocyanates used for preparing a polyurethane polymer PUP may be aliphatic, cycloaliphatic or aromatic polyisocyanates, especially diisocyanates, examples being the monomeric diisocyanates already mentioned as suitable polyisocyanates PI, and also oligomers and polymers of these monomeric diisocyanates, and also any desired mixtures of these isocyanates. Preference is given to monomeric diisocyanates, especially MDI, TDI, HDI and IPDI.

A polyurethane polymer PUP is prepared in a known way directly from the polyisocyanates and the polyols, or by stepwise adduction processes, of the kind also known as chain extension reactions.

In one preferred embodiment the polyurethane polymer PUP is prepared via a reaction of at least one polyisocyanate and at least one polyol, the isocyanate groups being present in a stoichiometric excess relative to the hydroxyl groups. Advantageously the ratio between isocyanate and hydroxyl groups is 1.3 to 10, in particular 1.5 to 5.

Advantageously the reaction is carried out at a temperature at which the polyols, polyisocyanates used and the polyurethane polymer formed are liquid.

The polyurethane polymer PUP has a molecular weight preferably above 500 g/mol, in particular one of between 1000 and 30 000 g/mol.

Additionally the polyurethane polymer PUP preferably has an average NCO functionality in the range from 1.8 to 3.

Also suitable as polyisocyanate P finally, are mixtures comprising a polyurethane polymer PUP and a polyisocyanate PI, in particular, on the one hand, mixtures comprising an MDI-based polyurethane polymer PUP and monomeric and/or polymeric MDI, and, on the other hand, mixtures comprising an IPDI-based polyurethane polymer PUP and monomeric and/or oligomeric IPDI.

Particularly preferred as polyisocyanate PI is an aromatic diisocyanate, especially 4,4'-, 2,4'- and 2,2'-diphenylmethane diisocyanate and any desired mixtures of these isomers (MDI) with one another.

The preparation of the reaction product from crystalline polyester polyol P1, solid polyester polyol P2, optionally polyol P3; and polyisocyanate PI takes place in a manner known to the person skilled in the art. In particular it is possible, in one version to introduce the polyisocyanate PI and to add a mixture of the polyols P1, P2 and P3 with stirring. In another version a mixture of the polyols P1, P2 and P3 can be introduced and the polyisocyanate PI added with stirring.

In order to obtain a reaction product containing isocyanate groups it is essential that the polyisocyanate PI is used in a stoichiometric excess in relation to the polyols P1 and P2 and P3.

Advantageously here the ratio between the isocyanate and hydroxyl groups is 1.3 to 10, especially 1.5 to 5, preferably 1.8 to 2.5.

The amount of all of the polyester polyols P1 used for preparing the reaction product is advantageously chosen such that it is more than 20%, in particular 25%-90%, preferably 30%-85% by weight, based on the overall composition.

The amount of all of the polyester polyols P2 used for preparing the reaction product is advantageously chosen such that it is more than 2%, in particular 2.5%-30%, preferably 5%-20% by weight, based on the overall composition.

The amount of all of the polyester polyols P3 used, if appropriate, for preparing the reaction product is advantageously chosen such that it is 10%-50% by weight, preferably 20%-45% by weight, based on the overall composition.

It is particularly advantageous if the weight sum of all the polyester polyols P1 and all the polyester polyols P2 is greater than the weight sum of all the polyols P3.

The fraction of the reaction product is advantageously more than 50% by weight, in particular more than 70% by weight, based on the weight of the laminating adhesive composition.

The laminating adhesive composition may comprise further constituents of the kind typically used in accordance with the prior art. To the person skilled in the art it is clear in this case that such further constituents, as a function of the respective composition and in their nature and amount, are to be chosen such that, in spite of their presence, the composition is stable on storage.

If desired, the laminating adhesive composition comprises non-reactive thermoplastic polymers, such as homopolymers or copolymers of unsaturated monomers, for example, in particular from the group encompassing ethylene, propylene, butylene, isobutylene, isoprene, vinyl acetate or higher esters thereof, and (meth)acrylate. Particular suitability is possessed by ethylene-vinyl acetate copolymers (EVA), atactic poly-α-olefins (APAO), polypropylenes (PP) and polyethylenes (PE).

If desired the laminating adhesive composition comprises catalysts for the reaction of the isocyanate groups, such as metal compounds or tertiary amines.

Examples of suitable metal compounds are tin compounds such as dibutyltin diacetate, dibutyltin dilaurate, dibutyltin distearate, dibutyltin diacetylacetonate, dioctyltin dilaurate, dibutyltin dichloride, dibutyltin oxide, tin(II) carboxylates; stannoxanes such as laurylstannoxane; bismuth compounds such as bismuth(III) octoate, bismuth(III) neodecanoate or bismuth(III) oxinates.

Examples of suitable tertiary amines are 2,2'-dimorpholinodiethyl ether and other morpholine ether derivatives, 1,4-diazabicyclo[2.2.2]octane and 1,8-diazabicyclo[5.4.0]undec-7-ene.

The laminating adhesive composition may also comprise mixtures of the aforementioned catalysts. Particular suitability is possessed by mixtures of metal compounds and tertiary amines.

If desired, the laminating adhesive composition comprises reactive diluents or crosslinkers, examples being oligomers or polymers of diisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate, 1,3- and 1,4-tetramethylxylylene diisocyanate, especially isocyanurates, carbodiimides, uretonimines, biurets, allophanates and iminooxadiazinediones of the stated diisocyanates, adducts of polyisocyanates with short-chain polyols, and also adipic dihydrazide and other dihydrazides, and further blocked amines such as oxazolidines, enamines or ketimines.

The laminating adhesive composition may further comprise other additions, such as, in particular fillers, plasticizers, adhesion promoters, especially compounds containing silane groups, UV absorbers, UV or heat stabilizers, antioxidants, flame retardants, optical brighteners, pigments, dyes and driers, and also further substances, commonly used in isocyanate compositions.

In one preferred embodiment the laminating adhesive composition is free of carbon black.

In a further preferred embodiment the laminating adhesive composition is completely free of fillers.

With particular preference the laminating adhesive composition is free, or at least substantially free, from plasticizers and solvents.

The above-described laminating adhesive composition is prepared and stored in the absence of moisture. In a suitable pack or arrangement, impervious to ambient conditions, such as in a drum, pouch or cartridge, for example, its storage stability is outstanding. The terms "storage-stable" and "storage-stability", in connection with a composition or an adhesive refer in the present document to the fact that the viscosity of the composition at the application temperature, given suitable storage, does not increase within the time span under consideration, or during that time increases only to such an extent that the composition remains suitable for use in the manner intended.

For the mode of action of a reactive hot-melt adhesive it is important that the laminating adhesive composition can be melted, in other words that at the application temperature it has sufficiently low viscosity to be able to be applied, and that on cooling it very quickly develops a sufficient bond strength, even before the crosslinking reaction with water, more particularly in the form of atmospheric moisture, is concluded (initial strength). It has emerged that, at the application temperature, which for hot-melt adhesives is in the range from 80° C. to 200° C., typically from 120° C. to 160° C., the laminating adhesive composition described has a readily manageable viscosity and that on cooling it develops good bond strength with sufficient rapidity. A readily manageable viscosity refers in particular to a viscosity of 1-50 Pa·s.

In a further aspect, the present invention provides a method of laminating a support material with a polymeric film, comprising the steps of
i) applying a melted laminating adhesive composition K as described above to a polymeric film KF;
ii) heating the polymeric film KF;
iii) contacting the laminating adhesive composition K on the polymeric film KF with a support material S;
or
i') applying a melted laminating adhesive composition K as described above to a support material S;
ii') heating a polymeric film KF;
iii') contacting the laminating adhesive composition on the support material S with the polymeric film.

The essence of the invention is apparent to particularly good effect when step iii) is followed by a step iv):
iv) removing the laminated support material from the laminating tool used for steps i) to iii), or i') to iii'), at an adhesive temperature of 40° C. or more, in particular of 50° C. or more, preferably from 55° C. to 100° C.

It is then found in particular that, when the laminating adhesive composition of the invention is used, great advantages become apparent to the effect that, in spite of the high demoulding temperature, the laminated bond remains intact and there is no detachment apparent. To the person skilled in the art it is of course clear that this advantage is also present at temperatures lower than 40° C., i.e. even at room temperature.

The melted laminating adhesive composition K can be applied in a variety of ways, as for example, by a spraying, spreading, knife-coating, die application, roll application or casting application process.

The application of the laminating adhesive composition K takes place preferably at a temperature of 120-190° C. in step i), or i').

In the first of the above two versions of this method, the melted laminating adhesive composition K is applied to a polymeric film KF. This produces a coated polymeric film.

In one embodiment this film, after cooling to room temperature, can be used in the form of coated film as an intermediate. Cooling can be accelerated by using a cooling means, a blower for example, in particular an air blower for cooling. The coated polymeric film thus produced can then, in accordance with requirements, be cut to length, cut up, rolled up or further processed directly. The rolls of the coated polymeric films can then, in accordance with requirements, be stored or transported. In the case of rolling it is possible here to use release paper interleaves in order to prevent parts of the film that lie against one another—as a result of the rolling—coming into direct contact with one another. It has nevertheless been found that in many cases it is possible to do without the use of such release paper interleaves, and that blocking—as it is known—of the rolled film does not occur even after prolonged storage or transport times. For more prolonged storage, however, it is of very great advantage if this coated film is protected from the influence of water. This can be done, for example, by means of a moisture-tight pack, such as a welded polymeric film or aluminium pouch, for example, with the interior advantageously being evacuated or filled with inert gas prior to sealing. Thus, for example, the coated polymeric film can be coated at the premises of the film manufacturer, and can be subsequently stored and supplied to the site or to the plant at which this precoated film is then bonded to a support. In spite of this time span, which in certain circumstances is long, between coating and processing, a flawless adhesive bond can be ensured. This may be of great advantage more particularly on account of the fact that within the industry, particularly in vehicle production, there is a trend observable in manufacture, away from the line and towards the supplier. This trend is continued in turn between the direct supplier—of car doors, for example—and its supplier—of decorative materials, for example—as well. To the person skilled in the art it is clear that under certain conditions it may nevertheless be advantageous to use interleaves of a release paper.

In the short term, i.e. up to a few hours, a coated polymeric film can often be stored even without such a pack, and used further.

The coated polymeric films thus produced can then be further bonded, by heating the coated film, or the laminating adhesive composition K located on it, or wholly or partly melting it, in accordance with step ii), and then contacting it with the surface of a support material S, in accordance with step iii) in the method described above.

After the contacting of the adhesive with the support material S, i.e. after step iii), or after the contacting of the adhesive with the polymeric film KF, i.e. after step iii'), the laminating adhesive composition K cools and undergoes solidification. This solidification produces an initial strength, allowing small forces between the substrates to be transmitted even at this stage and, in certain circumstances, allowing slipping of a substrate to be prevented and transportation to take place. As a result of the reaction of water with the adhesive, the adhesive is crosslinked, leading to the development of the ultimate strength and the heat resistance. The reaction with water begins as soon as the adhesive comes into contact with atmospheric moisture—in other words, generally speaking, right at the beginning of application. The ultimate strength is attained when the crosslinking has run its full course; this may take a very wide range of times, typically several days, and is heavily dependent on the climatic conditions, the substrates, the bond strength and the bonding geometry.

This method of lamination results in a laminated support material 1, or an article. The laminated support material, or article thus formed is advantageously a laminated support material or an article of industrial manufacture, particularly an article for interior fitment. Preferably it is a part for installation in a means of transport or is employed in the furniture sector.

Particular importance attaches to the use of the coated polymeric film, and of the method described, respectively, for the production of interior trim parts of vehicles, more particularly of cars. Examples of such interior trim parts are door side parts, switch panels, parcel shelves, roof panel linings, sliding-roof panel linings, centre consoles, glove boxes, sun visors, pillars, door handles, armrests, floor assemblies, loading-floor assemblies and boot assemblies, and also sleeping-cab walls and rear walls of vans and lorries.

With particular suitability this method is a vacuum forming process. In the case of the vacuum forming process, the laminating adhesive composition K can be applied to a support material S or else a polymeric film KF coated with laminating adhesive composition K can be employed. Typically the polymeric film (decorative element of air-impermeable material) more particularly of plasticized PVC, can be clamped in an airtight manner in a frame. Beneath the film there is a bottom mould onto which the support is placed. The bottom mould and support have drill holes or are air-permeable. The apparatus is closed off in an airtight manner as well towards its bottom. Before the vacuum or subatmospheric pressure is applied, the decorative material is heated, typically to a temperature of about 160° C., and so the film becomes soft and the hot-melt adhesive undergoes complete or partial melting. When the air is withdrawn from this apparatus under suction, the decorative material conforms accurately to the support component, under the atmospheric pressure bearing on the surface of the material, and is bonded to the said component. On account of the vacuum, or subatmospheric pressure, that is to be produced, the decorative material is air-impermeable. In the case of vacuum forming it is also possible to use a polymeric film, coated as above with laminating adhesive composition K, and made more particularly of PPVC, which is heated prior to contacting, or prior to the application of the vacuum.

In this embodiment, therefore, a subatmospheric pressure is applied between step ii) and iii), or between step ii') and iii').

In the case of the press lamination process, the laminating adhesive composition K likewise can be applied to the support, or to the decorative element, i.e. of the polymeric film, beforehand. The bonding of the support to the decorative element is accomplished, following thermal activation by means, for example of an IR lamp array, to a temperature of typically above 80° C., and so the adhesive melts at least partially, with joining and pressing. Demoulding (adhesive temperature) may take place at room temperature or by virtue of the compositions of the invention, even at higher temperatures i.e. 40° C. or more, especially 50° C. or more, preferably from 55° C. to 100° C.

The polymeric films utilized here are in many cases decorative films and have a surface texture. This surface texture on the polymeric film may be introduced by embossing before, during or after adhesive bonding.

The advantages of the present method are apparent to particularly good effect when the support material has a three-dimensionally deformed surface. A support material having a three-dimensionally formed surface is understood here to be a support material of non-planar geometry, i.e. in particular not in the form of sheets. Support material with a three-dimensionally deformed surface may be produced by forming operations from sheets. Such forming operations are typically carried out under the influence of temperature and/or pressure. Additionally it is possible for support material having a three-dimensionally deformed surface to be obtained by known methods, in particular by extrusion or injection operations such as reaction transfer moulding (RTM) or injection moulding or reaction injection moulding (RIM).

As a result of the three-dimensional conformation of the film to the three-dimensionally deformed surface in fact, the forces acting on the polymeric film are very great, in particular at an early point in time, where the chemical crosslinking is not yet complete and especially at high temperatures, if, in the case of usual hot-melt adhesives, the physical adhesion and cohesion forces of the hot-melt adhesive, produced by the cooling of the adhesive, have not yet developed, or not yet developed completely.

These forces acting on the polymeric film, or on the laminating adhesive composition, are particularly great in the case of thin layers of adhesive. Accordingly, the advantages essential to the invention are manifested especially in the case of thin adhesive layers.

An effective bond between polymeric film and support material is also formed in depressions in the support material, i.e. in indentations, channels, corners and the like, especially where the surface of the support material is concave.

Advantageously, therefore, the layer thickness of the laminating adhesive composition K after contacting in step iii), or in step iii'), is less than 500 μm, in particular between 5 μm and 200 μm, preferably between 10 μm and 150 μm.

The polymeric film is made in particular of plasticized polyvinyl chloride (pPVC).

The support material is on the one hand composed in particular of a thermoplastic which is in particular selected from the group consisting of thermoplastic polyurethane (TPU), acrylonitrile/butadiene/styrene copolymers (ABS), polycarbonate (PC), polypropylene (PP) and mixtures thereof.

The support material is on the other hand more particularly a resin-bound fibre material. Fibre material used in particular is sawdust, wool, felt, cotton fibres, and natural plant fibres such as sisal, jute, hemp, flax or coconut fibres.

BRIEF DESCRIPTION OF THE DRAWINGS

In the text below, the invention is illustrated further, schematically, with reference to drawings. Like elements in the various figures are given the same reference symbols. Movements are indicated with arrows. In the figures:

FIG. 2 shows the construction of a polymeric film coated with laminating adhesive K FIG. 3 shows a diagrammatic, perspective cross-sectional view of a three-dimensionally deformed support material FIG. 3a prior to lamination FIG. 3b after lamination

Figure 1:
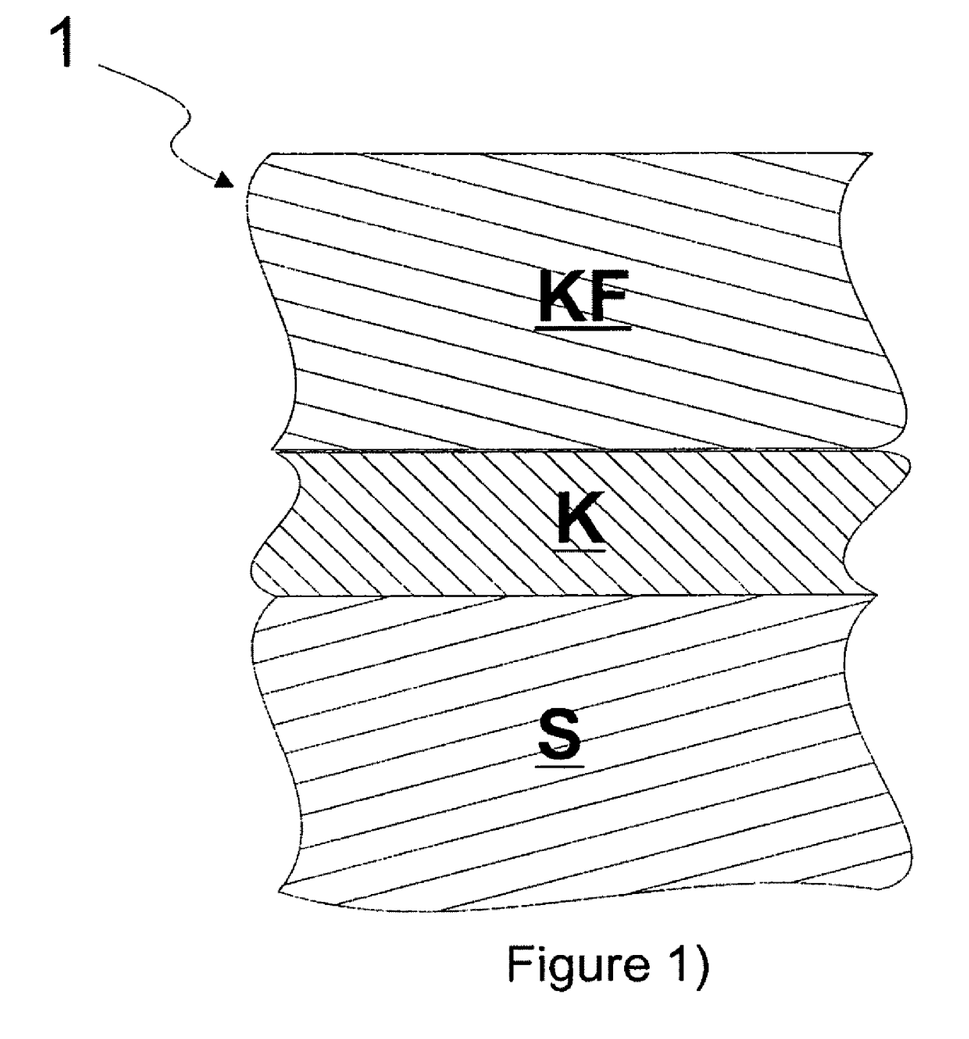
FIG. 1 shows a diagrammatic cross section through a laminated support material

FIG. 1 shows a laminated support material 1, which is composed of a support material S, a polymeric film KF and a laminating adhesive K.

Figure 2A:
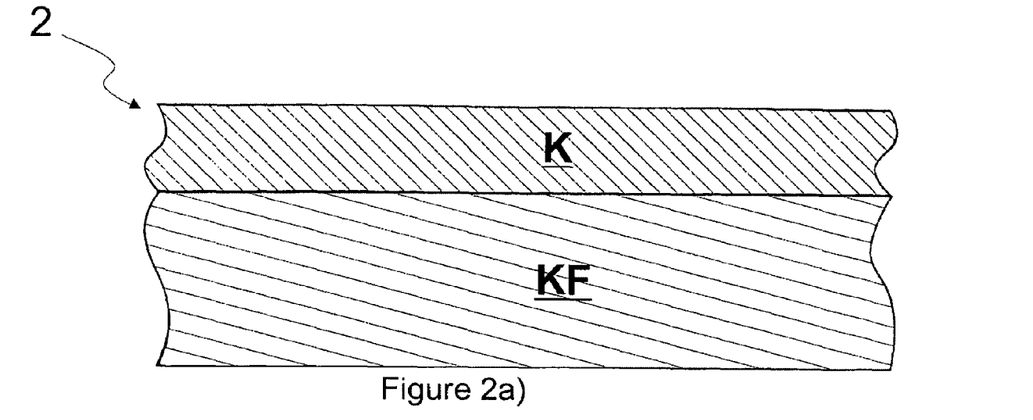
FIG. 2a shows a diagrammatic-cross section through a polymeric film KF coated with laminating adhesive K

FIG. 2a shows a polymeric film 2 coated with a hot-melt adhesive K. In this case the laminating adhesive K has been applied layerwise to a polymeric film KF.

Figure 2B:
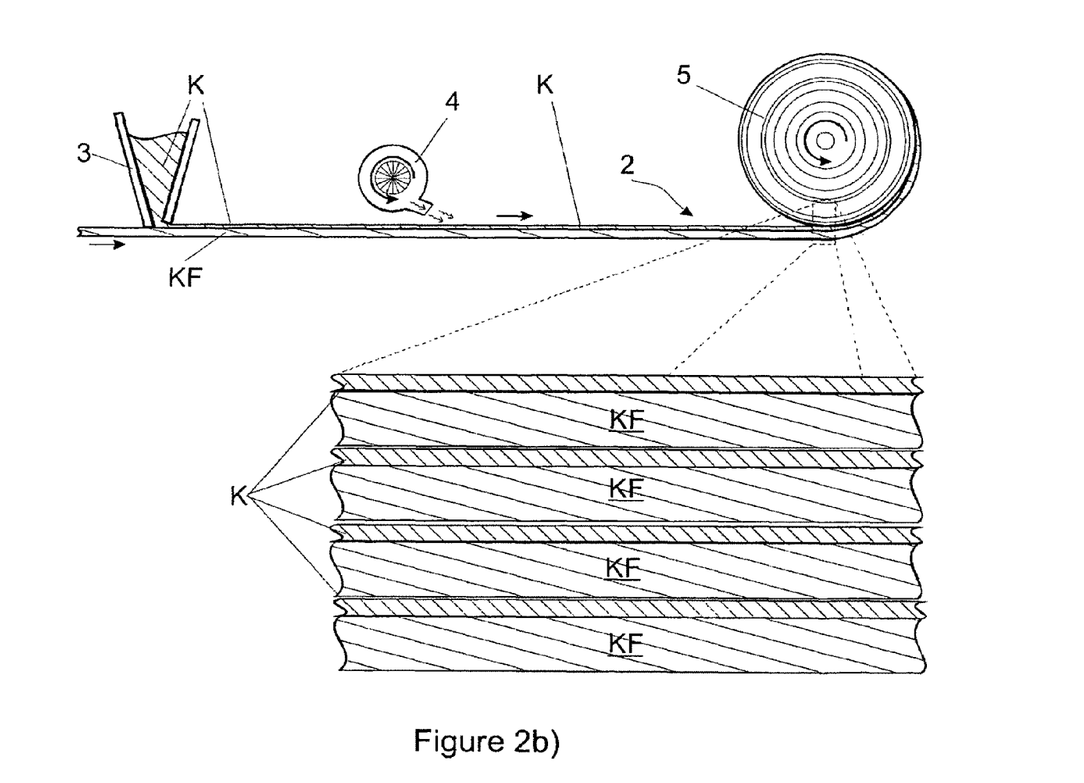
FIG. 2b shows a cross section through a diagrammatic production method for a polymeric film KF coated with laminating adhesive K

FIG. 2b shows diagrammatically the production of a coated polymeric film 2. In the embodiment shown here, the laminating adhesive K is applied as a layer to the polymeric film KF by means of applicator unit 3. In this case, the polymeric film is moved under the applicator unit 3. Typically the polymeric film is unwound from a roll (not shown). Following application, the melted laminating adhesive K is cooled by means of cooling means 4 (an air blower, for example). FIG. 2b shows, additionally, that this coated polymeric film 2 is rolled up. Furthermore, in the bottom part of FIG. 2b an enlarged diagrammatic extract of a roll 5 is shown with coated polymeric film 2 rolled up. As a result of the rolling-up of the coated polymeric film, the individual plies of the coated polymeric film 2 are in direct contact with one another and, in particular, have no release paper interleaves. As and when required, the coated polymeric film can be unwound without blocking, even after prolonged storage or transport time, from the roll 5.

As and when required, a coated polymeric film 2 of this kind is heated, and so it, or the laminating adhesive K, become soft or is at least partially melted and is contacted with a support material S and typically bonded under pressure, thus giving a laminated support material 1, as depicted in FIG. 1.

Figure 3A:
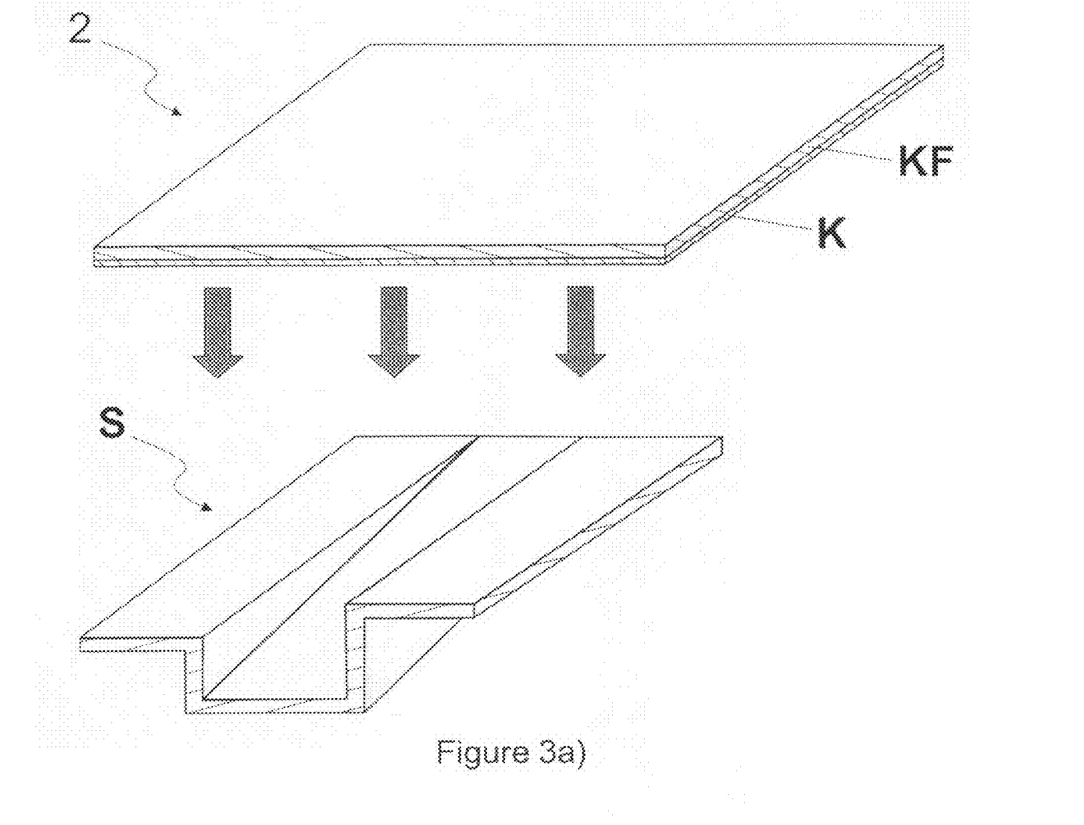

FIG. 3*a* shows a perspective cross-sectional view of a polymeric film KF and also of a three-dimensionally deformed support material S prior to the laminating operation.

Figure 3B:
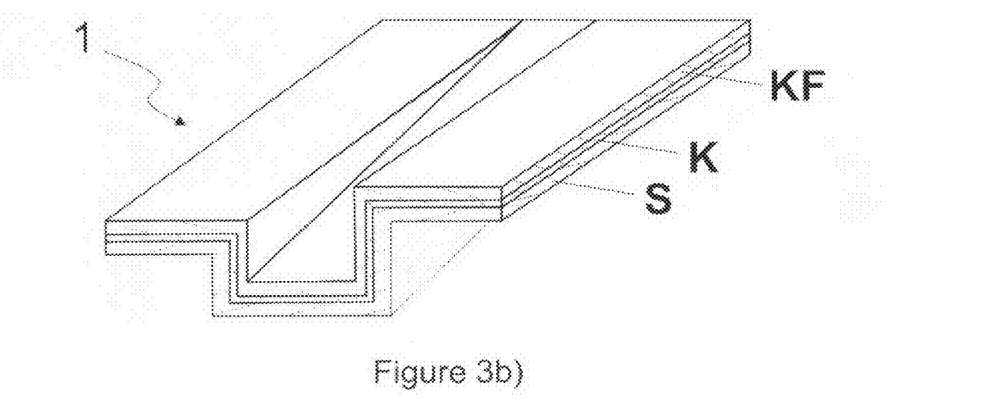

FIG. 3*b* shows a perspective cross-sectional view of a laminated, three-dimensionally deformed support material 1 after the laminating operation.

Figure 4A:
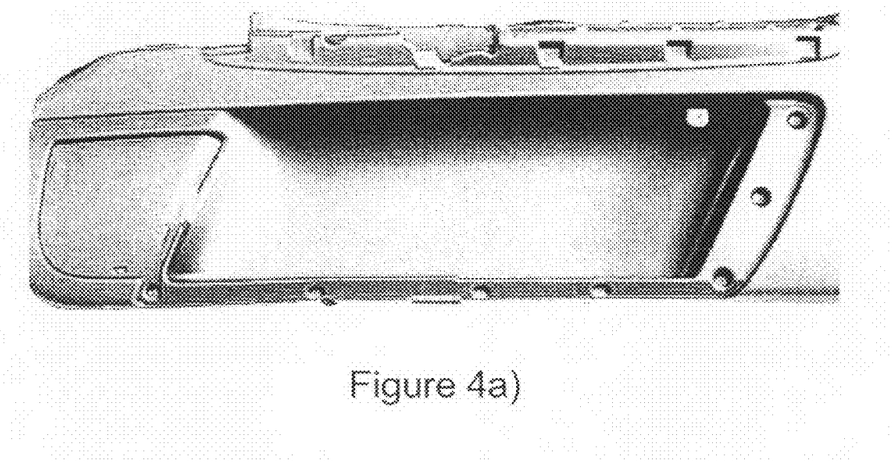
FIG. 4a is a photograph of a laminated support material without detachment of the film, assessed as "good"
Figure 4B:
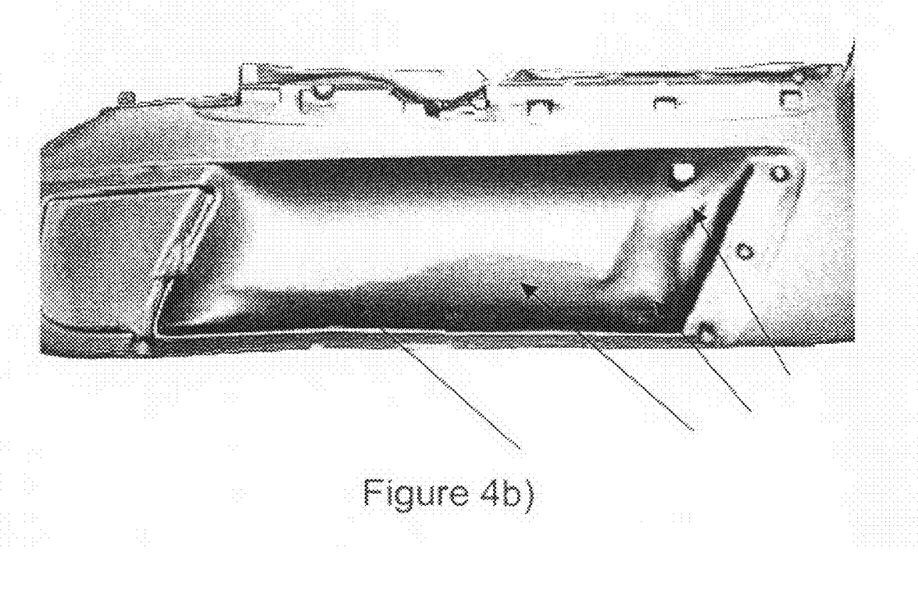
FIG. 4b is a photograph of a laminated support material with detachment of the film, assessed as "poor".

FIG. 4*a*) shows a photograph of a support material with "good" lamination and FIG. 4*b*) shows a photograph of a support material with "poor" lamination. The support material in this case is a resin-bonded natural fibre support material and the polymeric film is a plasticized PVC film. In the fields marked by arrows in FIG. 4*b*, detachment of the PVC film from the support material is apparent.

LIST OF REFERENCE SYMBOLS

1 laminated support material
2 coated polymeric film
3 applicator unit
4 cooling means
5 roll of a coated polymeric film 2
K laminating adhesive, laminating adhesive composition
KF polymeric film
S support material

EXAMPLES

Preparation of Hot-Melt Adhesives

In accordance with Table 2, adhesive 1 and also comparative adhesives Ref 1, Ref 2 and Ref. 3 were prepared, by slowly adding, to the melted polyols, in accordance with Table 1, the corresponding amount of polyisocyanate, with heating and stirring and under partial vacuum. When a constant NCO content was attained, the adhesive was dispensed into moisture-proof aluminium cartridges.

TABLE 1

Polyols used

| Designation | Characterization |
|---|---|
| P1' | partially crystalline saturated polyester polyol, solid at room temperature, molecular weight 3500 g/mol, hydroxyl number: 27-34 mg KOH/g, softening point: 128° C. |
| P2' | partially crystalline saturated polyester polyol, solid at room temperature, molecular weight 11 000 g/mol, hydroxyl number: 10 mg KOH/g, softening point: 155° C. |
| P3-1' | saturated polyester polyol, liquid at room temperature, hydroxyl number: 18-24 mg KOH/g, molecular weight 5550 g/mol |
| P3-2' | amorphous saturated polyester polyol, solid at room temperature, hydroxyl number: 31-39 mg KOH/g, molecular weight 3000 g/mol, softening point: 76° C. |

The adhesives were melted at a temperature of 160° C. and applied to a plasticized PVC film (film thickness: 2 mm) at 100 g/m² by means of roll application. Subsequently, the polymeric film thus coated was laminated by means of vacuum lamination to a three-dimensionally shaped, resin-bound natural fibre support material, with heating of the film (by means of IR lamps, temperature of underside of film (i.e. adhesive side) 255-265° C.) after vacuum times of varying length ($t_{vac}$).

For assessing the properties, the laminated support material was removed from the laminating mould at different demoulding temperatures ($T_D$), measured by thermocouple measurement of the temperature of the adhesive on demoulding, and subjected to visual assessment. Where detachment of the film was apparent, the result was assessed in Table 2 as being "poor". Where there is no detachment of the film, the result was assessed in Table 2 as being "good".

TABLE 2

Adhesive formulations.

| | 1 | Ref. 1 | Ref. 2 | Ref. 3 |
|---|---|---|---|---|
| P1' | 40.33 | 40.33 | 40.33 | |
| P2' | 8.07 | | | 8.07 |
| P3-1' | 12.10 | 12.10 | 12.10 | 12.10 |
| P3-2' | 28.23 | 28.23 | 36.30 | 28.23 |
| Desmodur 44 MC (MDI) | 11.28 | 11.50 | 12.90 | 6.00 |
| $T_D = 55°$ C. | | | | |
| $t_{vac} = 20$ s | good | poor | poor | poor |
| $t_{vac} = 30$ s | good | poor | poor | poor |
| $t_{vac} = 55$ s | good | poor | poor | poor |
| $T_D = 40°$ C. | | | | |
| $t_{vac} = 20$ s | good | poor | poor | poor |
| $t_{vac} = 30$ s | good | poor | poor | poor |
| $t_{vac} = 55$ s | good | poor | poor | poor |

FIG. 4*a*) shows a photograph of Example 1 (a support material with "good" lamination) and FIG. 4*b*) shows a typical photograph of one of the comparative examples Ref. 1-Ref. 3 (a support material with "poor" lamination). Severe detachment is apparent in FIG. 4*b*) in those areas where the support material has indentations, especially at the sites of high surface curvature. These areas are marked with arrows.

The invention claimed is:

1. A laminating adhesive composition comprising a reaction product which contains isocyanate groups and is obtained from the reaction of
   a) at least one crystalline polyester polyol P1 which is solid at room temperature and has a number average molecular weight (Mn) of between 1500 and 9000 g/mol and a softening point of more than 100° C. and has an OH number of 10-50 mg KOH/g, and
   b) at least one polyester polyol P2 which is solid at room temperature and has a number average molecular weight (Mn) of 10000 to 50000 g/mol and a softening point of more than 130° C. and has an OH number of 1-10 mg KOH/g, and
   c) P3 comprising at least a first polyester polyol that is different than polyol P1 and polyol P2, wherein the at least first polyester polyol of P3 is a liquid at room temperature; with
   d) at least one polyisocyanate P, the polyisocyanate P being used in a stoichiometric excess in relation to the polyols P1 and P2 and P3, and
      wherein a weight sum of (i) all of the at least one crystalline polyester polyol P1 and (ii) all of the at least one polyester polyol P2 is greater than the weight sum of all of P3 included in the laminating adhesive.

2. The laminating adhesive composition according to claim 1, wherein the amount of all of the crystalline polyester polyols P1 used for preparing the reaction product is chosen such that it is more than 20% by weight, based on the overall composition.

3. The laminating adhesive composition according to claim 1, wherein the polyester polyol P2 has an OH number of at least 1 but is less than 5 mg KOH/g.

4. The laminating adhesive composition according to claim 1, wherein the amount of all of the polyester polyols P2 used for preparing the reaction product is chosen such that it is more than 2% by weight, based on the overall composition.

5. The laminating adhesive composition according to claim 1, wherein the polyisocyanate P is an aromatic diisocyanate.

6. The laminating adhesive composition according to claim 1, wherein the fraction of the reaction product is more than 50% by weight, based on the weight of the laminating adhesive composition.

7. The laminating adhesive composition according to claim 1, wherein P3 further comprises a second polyester polyol that is a solid at room temperature.

8. The laminating adhesive composition according to claim 7, wherein the at least first polyester polyol has an OH number ranging from 18 to 24 mg KOH/g and the second polyester polyol has an OH number ranging from 31 to 39 KOH/g and a softening point of less than about 76° C.

* * * * *

UNITED STATES PATENT AND TRADEMARK OFFICE
CERTIFICATE OF CORRECTION

| | | |
|---|---|---|
| PATENT NO. | : 8,389,647 B2 | Page 1 of 1 |
| APPLICATION NO. | : 12/379675 | |
| DATED | : March 5, 2013 | |
| INVENTOR(S) | : Paschkowski | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Second Day of December, 2014

Michelle K. Lee
*Deputy Director of the United States Patent and Trademark Office*